March 2, 1943. A. C. CHAMBERLIN ET AL 2,312,626
STRIP MARKING DEVICE
Filed July 12, 1940 3 Sheets-Sheet 1
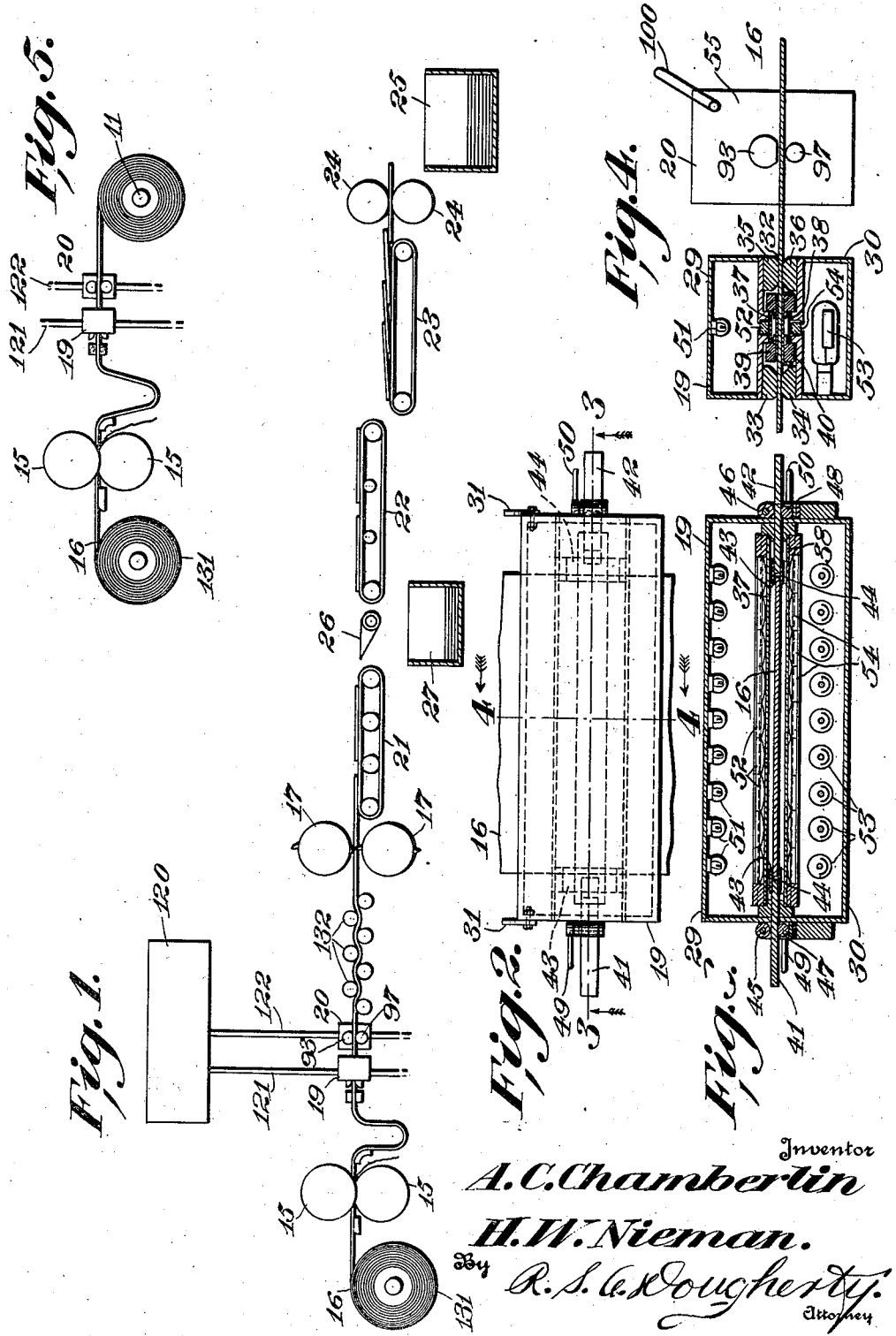
Inventor
A. C. Chamberlin
H. W. Nieman
By R. S. C. Dougherty
Attorney

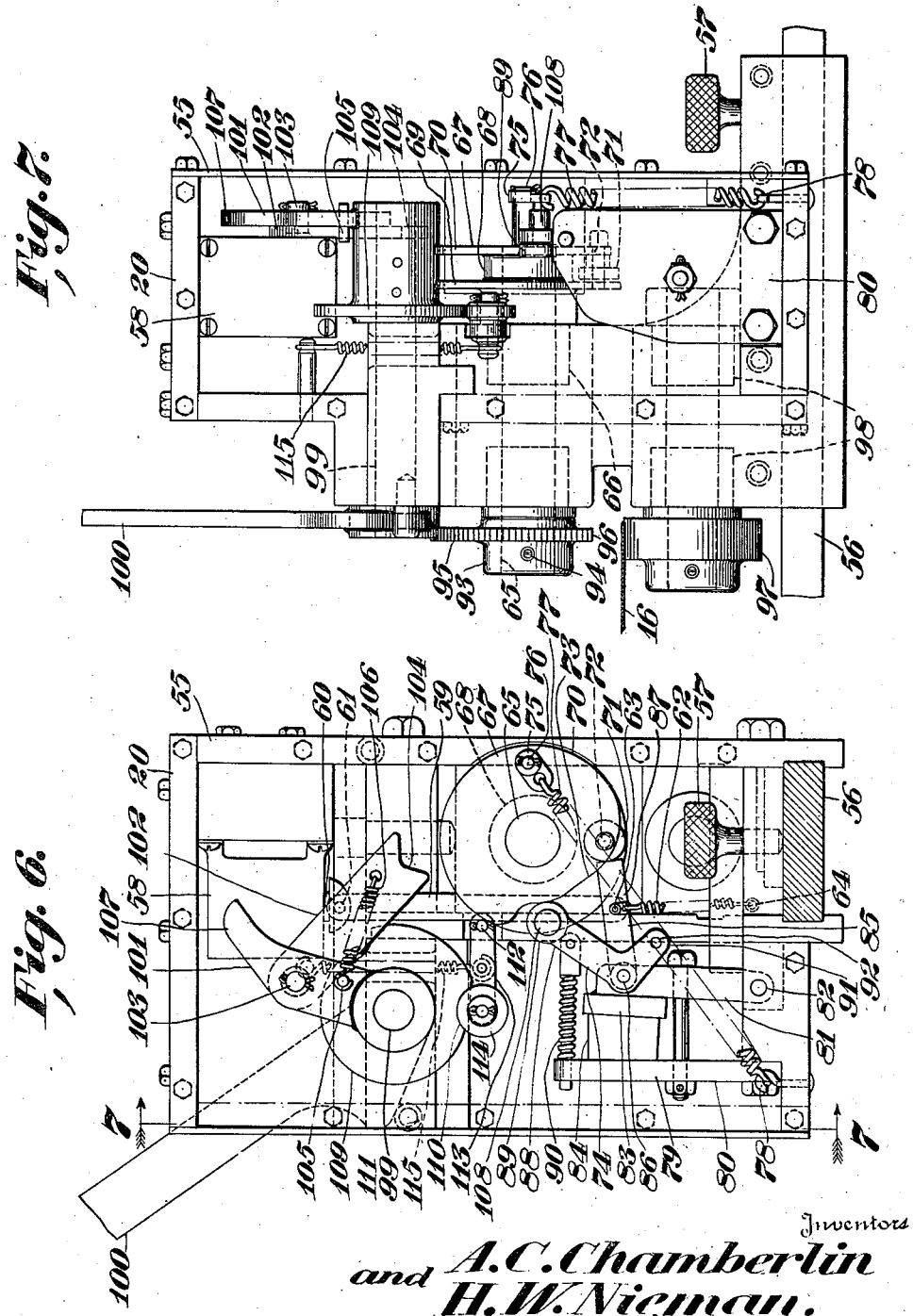

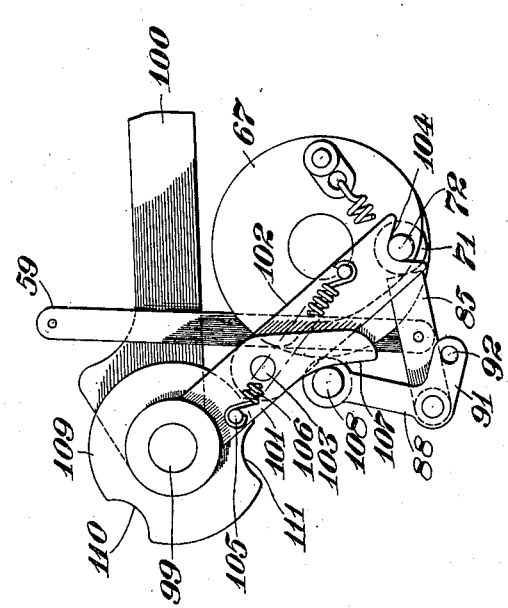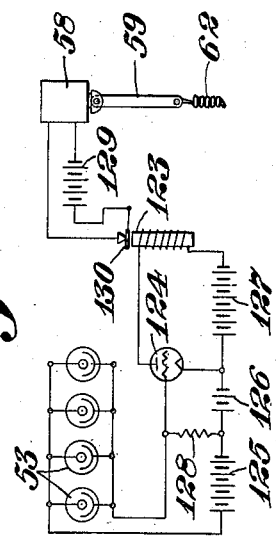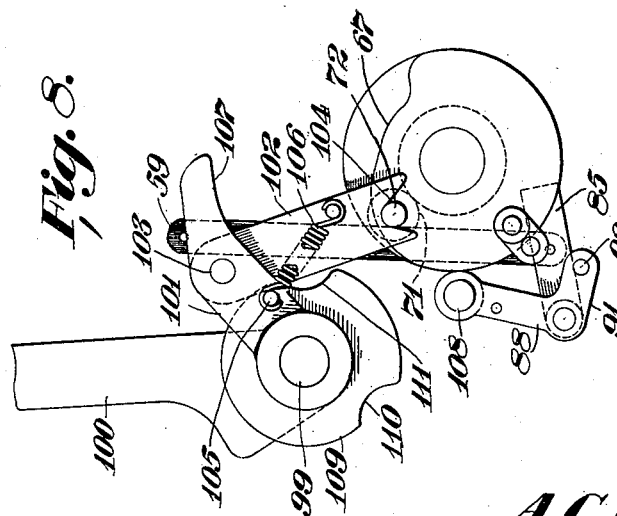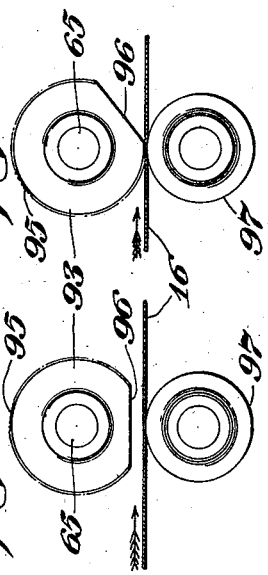
Inventor
A. C. Chamberlin
and H. W. Nieman.
By R. S. C. Dougherty.
Attorney Patented Mar. 2, 1943

2,312,626

UNITED STATES PATENT OFFICE 2,312,626

STRIP MARKING DEVICE

Alan C. Chamberlin and Henry W. Nieman, Bethlehem, Pa., assignors to Bethlehem Steel Company, a corporation of Pennsylvania Application July 12, 1940, Serial No. 345,248

13 Claims. (Cl. 101—234)

Our invention relates to apparatus for inspecting material for imperfections and particularly to the inspection of flat products.

An object of our invention is to provide means for inspecting material which will detect light pervious defects of small dimensions in the material being inspected.

Another object of our invention is to provide an inspecting device which will automatically inspect material and classify it according to its characteristics.

Another object of our invention is to provide means for designating material which has been inspected by inspecting apparatus, according to the characteristics of said material.

Another object of our invention is to provide in combination with apparatus for inspecting material for defects therein, apparatus for indicating the portions of the material containing defects.

Another object of our invention is to provide in combination with a device for inspecting material, apparatus actuated by said inspecting device for marking portions of said material having certain characteristics.

The novel features of our invention will be more fully understood from the following description and claims taken with the drawings in which Figure 1 is a side view partly in elevation and partly diagrammatic illustrating one embodiment of our invention;

Fig. 2 is an enlarged top view of the inspecting device;

Fig. 3 is a section taken on the line 3—3 of Fig. 2;

Fig. 4 is a section taken on the line 4—4 of Fig. 2 together with a view in elevation of the marking device;

Fig. 5 is a side view in elevation of a modified structure embodying our invention;

Fig. 6 is a side view of the marking device;

Fig. 7 is a section taken on the line 7—7 of Fig. 6;

Fig. 8 is an elevation showing the resetting mechanism;

Fig. 9 is an elevation showing the ultimate position of the resetting mechanism;

Fig. 10 is an elevation showing the normal position of the marking rolls;

Fig. 11 is an elevation showing the marking rolls in operation; and

Fig. 12 is a diagrammatic view of the electrical circuits and apparatus embodied in our invention.

Referring to Figures 1 to 4, inclusive, of the drawings, wherein we have shown one form of carrying out our invention in connection with an apparatus which includes a shear travelling at a high rate of speed for shearing a strip into sheets or the like, 15 designates slitter rolls through which the material 16 is fed, 17 the flying shears which shear the material into sheets and which also govern the speed of the strip therethrough, or the like. Located intermediate the slitter rolls 15 and the shears 17 is our inspecting device 19, which is especially adaptable for inspecting sheet metal products in their uncoated condition, and our marking device 20.

Referring to Figure 5 we show our invention in connection with a strip of material which is not sheared after it passes through the slitter rolls 15, but which is recoiled onto the coiler 11, which operates to pull the material through our inspecting device 19 and marking device 20.

As shown in Figure 1, the material 16, after passing through the flying shears 17, is carried on the conveyers 21, 22 and 23 and through rolls 24 to the receptacle 25. Located between conveyors 21 and 22 is the deflector 26 which is of well known construction and serves to deflect off gauge sheets to the receptacle 27.

The inspecting device 19, as shown in Figures 2 to 4, inclusive, comprises a pair of housings 29 and 30 connected by hinges 31 to permit the upper housing 29 to be swung upwardly. Said housings define the opening 32 through which the strip 16 passes. Guides 33, 34, 35 and 36 are mounted in said housings adjacent the opening 32. Said guides are made of Bakelite or similar material to prevent scratching or otherwise defacing the surface of the strip. Extending laterally of the adjacent faces of the housings 29 and 30 are the windows 37 and 38 which are secured to the housings 29 and 30 in frames 39 and 40. Extending between the housings 29 and 30 are the guides 41 and 42 to each of which strips 43 and 44 are welded and which serve as side guides for the strip 16. On either side of the lower housing 30, the rollers 45 and 46, and the cams 47 and 48 having handles 49 and 50 are mounted. After strip 16 is threaded between the housings 29 and 30 the guides 41 and 42 are moved into abutting relationship with the sides of the strip and are then locked in position by means of the cams 47 and 48. The tightening of cams 47 and 48 retracts the guides 41 and 42 slightly from the edges of strip 16 thus preventing jamming of the strip in the guides. The guides 41 and 42 together with the strips 43 and 44 direct the strip 16 through the inspecting device and also prevent objectionable light from entering the housing 30.

Mounted in the housing 29 is a plurality of illuminating devices 51 for directing luminous energy onto the surface of the strip material. Lenses 52 are provided to direct the luminous energy vertically onto the strip. Mounted in the housing 30 is a plurality of light sensitive elements 53 which are preferably photoelectric cells and which are disposed so as to receive rays from the source of luminous energy 51. Lenses 54 are positioned in the housing 30 to direct such luminous energy onto the light sensitive elements 53.

The strip 16 together with guides 41 and 42 effectively prevents light from entering the housing 30 and striking the elements 53. However, if any light pervious imperfections are present in said strip as it is passed between the housings, they will permit the energy from sources 51 to pass therethrough, through lenses 54 and onto the light sensitive elements 53.

After the strip 16 has been inspected by the apparatus 19, it is desirable to mark or otherwise designate those portions of the strip which contain defects. Such a device should be rapid and positive in operation. It should make a mark upon the strip which will not be obliterated in subsequent operations, which in the case of strip steel may include roller leveling and tinning. It should be of rugged construction, capable of operation upon material traveling at high rates of speed.

Referring to Figures 4, 6 and 7, the marking device 20 includes the cabinet 55 which rests upon the bar 56 and is movably secured thereto by the thumb screw 57 whereby the cabinet can be moved to and from the edge of the strip 16. Secured to the interior of the cabinet 55 is the solenoid 58. The link 59 is pivoted at its upper end to the armature 60 of the solenoid 58 at 61. One end of the spring 62 is secured to the link 59 at 63 and the other end of spring 62 is secured to the bottom of the cabinet 55 at 64.

Extending through one wall of the cabinet 55 is the shaft 65 mounted in journals 66. The cam 67 which comprises the body 68 and the flanges 69 and 70 is mounted on the inner end of the shaft 65. The roller 71 is mounted on the pin 72 between the flanges 69 and 70 of cam 67. Flange 70 of the cam is cut away at 73 in order to control the movement of bell crank 74 in a manner to be hereinafter described. The link 75 is pivoted on pin 76 extending from the flange 70 of cam 67. Spring 77 is secured at one end to link 75 and at the other end to the cabinet 55 at 78.

Mounted on the base of the cabinet 55 is the shock absorbing mechanism 79 comprising the rigidly mounted arm 80, an arm 81 pivoted at 82, the face plate 83 secured to the upper end of arm 81, and a block 84 of rubber or other resilient material bonded at opposite sides to arm 80 and face plate 83.

The trigger 85 is pivoted to arm 81 at 86 and to link 59 at 63 and its free end 87 projects against roller 71 and prevents rotation of the cam 67. Also pivoted at 86 is the bell crank 74. The upper arm 88 is provided with the roller 89 which bears against the flange 70 of cam 67, and is held in such position by the spring 90. The lower arm 91 is provided with the pin 92 projecting laterally from the end thereof.

The outer end of shaft 65 is provided with a roll 93 which is secured to the shaft by set screw 94, and the outer surface of which is knurled or otherwise indented as at 95. The roll 93 is provided with a flattened portion 96 on its periphery, and the roll is so mounted on shaft 65 that when cam 67 is in its set position as shown in Figure 6, the flattened portion 96 of roll 93 is at the bottom thereof.

Below roll 93 is the backing up roll 97 which is mounted in journals 98 secured to the cabinet 55. As shown in Figure 6, when the cam 67 is in its set position the rolls 93 and 97 are separated by reason of the flattened portion 96 of roll 93 being at the bottom thereof, thereby permitting the passage of the strip therethrough unimpeded. Rolls 93 and 97 are so spaced, however, that when roll 93 is in any other position than with the flattened portion lowermost, the distance between the rolls is less than the thickness of the strip being inspected.

The operation of the marking device can now be explained. Solenoid 58 is ordinarily maintained in an energized condition as a result of which armature 60 is held in its raised position against the pull of spring 62. Trigger 85 is at the same time held against roller 71 thus preventing the rotation of the cam 67 by the spring 77.

The photoelectric inspection device is so arranged that when a light pervious imperfection in the sheet being inspected passes therethrough, the circuit energizing the solenoid is broken, but is again completed as soon as the defect has passed the inspection device. This momentary release of the solenoid starts the mechanical operation of the marking device in the following manner.

The link 59 and the armature 60 are immediately pulled down by spring 62, thereby pulling the trigger 85 down and out of contact with roller 71. The lowering of trigger 85 permits spring 77 to start the rotation of cam 67, thus rotating shaft 65 and roller 93. Spring 77 rotates cam 67 and roller 93 only to the point at which the knurled periphery 95 of roller 93 engages the moving strip 16. From this point the moving strip 16 supplies the power for rotating the roller 93 around to its original position as shown in Figure 6, at which point further rotation is arrested by the trigger 85 which is returned to its original position in the following manner. At the same time, the knurled periphery of roller 93 will indent or otherwise mark the strip 16.

The roller 89 on the end of arm 88 of bell crank 74 is held against the edge of flange 70 by spring 90. As cam 67 rotates, the arm 88 will be moved outwardly and the arm 91 of bell crank 74 will be raised. Pin 92 on the end of arm 91 engages the trigger 85 raising it to its set position as shown in Figure 6, and thereby raising link 59 and armature 60. The solenoid 58 having been reenergized as above described, the armature 60, link 59 and trigger 85 will be retained in their raised position by the solenoid, against the pull of the spring 62. As above stated, when roller 93 has been carried through a complete revolution by the pull of strip 16, further rotation is prevented by trigger 85 acting against roller 71. At the completion of this cycle the marking device is again ready to be released by the photo-electric inspection device.

At high strip speeds, the work absorbed by the trigger 85 in stopping cam 67 at the completion of a revolution makes it necessary to provide a shock absorbing mechanism of some sort. As described hereinabove, the buffer 84 located behind the pivoted arm 81 takes the shock to which the trigger 85 is subjected.

Figure 10 shows the marking roll 93 and backing up roll 97 in their normal position, in which the flattened portion 96 is at the bottom of roll 93, thus permitting strip 16 to pass unimpeded between the rolls. Upon the release of solenoid 58 the action of spring 77 initiates the rotation of roll 93 until the knurled periphery 95 thereof engages strip 16, as shown in Figure 11. The further movement of strip 16 causes roll 93 to continue to revolve until the flattened portion 96 is again reached, at which time roll 93 is released from the action of strip 16, and is stopped from further rotation as hereinabove described.

If the trigger 85 is at any time released as a result of breaking the circuit in the solenoid 58 when no strip to be marked is passing between the rolls 93 and 97, spring 77 will cause the cam 67 to rotate through approximately half a revolution and then come to rest. This situation will ordinarily occur when the end of a coil of strip passes through the inspection device thus breaking the circuit which energizes the solenoid. In this position the marker is inoperative and can not reset itself automatically. In order to reset the marking device, the shaft 99 which extends through one wall of the cabinet is provided to which lever 100 is secured at the outer end of the shaft. Within the cabinet the arm 101 is secured to the shaft 99 and the arm 102 is pivotally secured to arm 101 at 103. Arm 102 is provided with a forked end 104. The arm 102 rests on the pin 105 and spring 106 is provided to maintain arm 102 in this position. Reference to Figures 8 and 9 will make the operation of the resetting mechanism clear.

In order to reset the marking device, lever 100 is moved in a clockwise direction from its position shown in Figure 6. This movement causes the forked end 104 of arm 102 to engage the pin 72 which, by reason of the partial revolution of cam 67 is in the position shown in Figure 8. Further movement of the lever 100 causes the cam 67 to be rotated counterclockwise to its starting position. At the same time the end 107 of arm 101 engages a pin 108 extending from the upper end of bell crank arm 88, thus moving arm 91 and pin 92 upwardly, thereby raising the trigger 85 to the point at which it contacts roll 71, and likewise, through link 59, returning armature 60 to the position at which solenoid 58 will hold it as soon as it is again energized.

The resetting mechanism maintains the marking device in locked position as hereinafter described until a new roll of material has been threaded through the inspection device and the solenoid is again energized. At this time, the arm 100 is moved to its original position shown in Figure 6, thus leaving the marking device in operative condition.

In order to hold the resetting mechanism in its inoperative or operative position, the disk 109, which is recessed at 110 and 111, is secured to shaft 99. Pivotally secured at 112 to the cabinet 55 is the arm 113 which terminates in roller 114, said roller engaging the recess 110 and being urged into contact therewith by spring 115. This roller effectively prevents the lever 100 from accidental movement. When arm 100 is moved to the right to reset the mechanism the roller 114 engages the recess 111 and holds the arm 100 until the resetting mechanism is manually returned to its original position after solenoid 58 has been energized.

As above stated, the marking device is ordinarily positioned adjacent to the photoelectric pinhole detector thus avoiding the necessity of introducing time delay mechanism in the electrical circuit.

The length of the mark made by the knurled roll 93 is of course dependent upon the size of the roll. A small mark is of course desirable. However, we prefer to make the roll 93 of sufficient size so that with such variations of the speed of the strip as may be encountered in practice, a defect therein will appear at some place within the area defined by lines drawn vertically at each end of the mark impressed by the roll and extended from edge to edge of the strip.

The electrical circuits and controls for the inspecting device 19 and the marking device 20 are located in housing 120 shown in Figure 1. Conduits 121 and 122 contain the electrical wiring to the inspecting device 19 and the marking device 20.

The wiring diagram of the electrical circuits is shown in Figure 12. The bank of photoelectric cells 53 is connected to the relay 123 through amplifier 124, batteries 125, 126 and 127 and resistor 128, as shown, following a standard arrangement for such apparatus. As shown in Figure 6 the solenoid 58 is energized by the battery 129, the circuit being completed through the relay arm 130. Accordingly the armature 60 of said solenoid is maintained in its raised position against the pull of spring 62 acting through link 59 as hereinabove described.

If, now, any of the photoelectric cells is actuated by light, the relay 123 will close, thus breaking the circuit which energizes solenoid 58 and permitting the armature 60 to be drawn down by spring 62. As soon as the light source is removed, the relay 123 will again open and reestablish the solenoid circuit.

In operation, the material 16 is fed from rolls 131 through the opening 32 in the inspecting device 19, thence between the rollers 93 and 97 of the marking device 20, and thence to the roller leveler 132 or other apparatus. The strip 16 together with the guides 33, 34, 35, 36, 41 and 42 effectively shut out light from the interior of housing 30 of inspecting device 19. The illuminating devices 51 will direct beams of light against the upper surface of the strip 16. So long as light is not permitted to strike the photoelectric cells 53, the marking device will remain inoperative. If, however, the strip passing through the inspecting device 19 contains a light pervious imperfection, light from the light source 51 will pass through such imperfection and onto one or more of the light sensitive elements 53, thereby energizing relay 123, breaking the circuit to the solenoid 58, and permitting the armature 60 to be drawn down by the spring 62. As heretofore explained, the drawing down of armature 60 trips the trigger 85 of the marking device 20 and causes the roll 93 of said device to rotate, thereby marking the strip 16. As soon as the light pervious defect in the strip passes out of the inspecting device 19, the solenoid circuit is reenergized, and the rotation of the marking roll 93 causes the trigger 85 to be reset, thus preparing the marking device for actuation again upon the passage through the inspecting device of another light pervious defect in the sheet.

We have shown the marking device 20 positioned immediately behind the inspecting device 19. It will be understood, however, that by including a time delay mechanism of well known type in the circuit it is possible to remove the marking device to a position farther removed from the inspecting device.

It will be understood that the marking device is not to be limited to use in connection with photoelectric inspection apparatus of the type hereinabove described since it is capable of operation in connection with other apparatus for initiating its movement.

Having thus described our invention, what we claim as new and desire to secure by Letters Patent is:

1. In combination with a device for inspecting a moving work piece by photo-electric means, a member positioned adjacent the work piece and adapted to be rotated thereby, said member being relieved to permit the movement of the work piece out of contact therewith, motor means for initiating the rotation of said member, stop means for rendering said motor means ineffective, and means controlled by said photo-electric means for rendering said stop means momentarily ineffective.

2. In a device for inspecting a moving work piece by photo-electric means, means for designating portions of said work piece having characteristics capable of energizing said photo-electric means, said designating means comprising a member adapted to be rotated by the work piece, motor means for moving said member into contact with the work piece, stop means for rendering said motor means ineffective, said stop means being maintained in position by a solenoid, means actuated by said photo-electric means for momentarily deenergizing said solenoid, and means actuated by the rotation of said rotatable member for resetting said stop means.

3. In a device for inspecting flat rolled material for light pervious imperfections by photo-electric means, a marking device for designating such imperfections comprising a pair of opposed rolls, the surface of one of said rolls adjacent the opposed roll being relieved to permit the passage of the material therebetween, means controlled by said photo-electric means for initiating the rotation of the relieved roll to permit the material to be gripped between the rolls, whereby the movement of said material will rotate the rolls through a complete revolution, and means on one of said rolls for designating that portion of the material which has been gripped by said rolls.

4. The combination including an inspecting device for moving strip material to be passed therethrough, a device for marking portions of said material having specified characteristics, said device comprising a pair of opposed rolls the surface of one of said rolls adjacent the opposed roll being relieved to permit the passage of the strip material therebetween and means controlled by said inspecting device for initiating the rotation of said relieved roll to permit the strip material to be gripped between said rolls, whereby the movement of said strip material will cause said rolls to rotate through a complete revolution.

5. A device for intermittently designating portions of a continuously moving band of strip material comprising a pair of opposed rolls one of which is capable of designating said band and one of which is relieved upon its surface adjacent to the opposed roll to permit the passage of said band therebetween, tension means for initiating the rotation of the relieved roll, trigger mechanism for preventing the rotation of the relieved roll, said trigger mechanism being maintained in operative position by a solenoid, means for tripping said trigger upon the deenergization of said solenoid to permit the rotation of said rolls and means for resetting said trigger to stop the rotation of said relieved roll after it has completed a single revolution.

6. In a device for intermittently designating portions of a moving strip of flat material, a pair of opposed rolls carried on shafts, the surface of one of said rolls being relieved to permit the passage of said strip therebetween, an abutment on the shaft carrying the relieved roll, trigger mechanism engaging said abutment to prevent rotation of said relieved roll, a solenoid for maintaining said trigger against said abutment, said solenoid being normally energized and adapted to be momentarily deenergized, means for tripping said trigger mechanism when the solenoid is momentarily deenergized, means for initiating the rotation of said relieved roll upon the tripping of said trigger mechanism whereby said rolls will grip the moving strip and will be rotated thereby, a cam on one of said shafts, and means actuated by said cam for resetting said trigger mechanism after it has been tripped.

7. In a device comprising a rotatable member adapted to be operated by the work, motor means to cause said member to move into engagement with the work and stop means to prevent the operation of said motor means, apparatus for initially setting said device comprising means for moving said rotatable member against the pull of said motor means, and means for moving said stop means into engagement with said rotatable member.

8. In a device comprising a rotatable member adapted to be operated by the work, motor means to cause said member to move into engagement with the work and stop means to prevent the operation of said motor means, apparatus for initially setting said device comprising a pivoted arm adapted upon rotation thereof to engage said rotatable member and move it against the pull of the motor means, and further adapted upon rotation thereof to engage said stop means and move it into engagement with said rotatable member.

9. A device for intermittently designating portions of a continuously moving band of strip material comprising a rotatable member adapted to be operated by the moving strip, means for initiating the rotation of said rotatable member, trigger means for preventing the rotation of said rotatable member, means for maintaining said trigger means in operative position, means for tripping said trigger means to permit the rotation of said rotatable member and means for resetting said trigger means to stop the rotation of said rotatable member after it has completed a single revolution.

10. A device for designating light pervious portions of a continuously moving strip of the material comprising in combination photoelectric means capable of being energized upon the passage therethrough of a light pervious portion of said moving strip, and designating means, said designating means including a rotatable member capable of being rotated by the moving strip to designate the light pervious portion, and means operable upon the energizing of said photoelectric means to move said rotatable member into engagement with said moving strip.

11. A device for moving marking strip material comprising a rotatable member normally out of contact with the moving strip material, means for bringing said rotatable member into contact with said moving strip material whereby to rotate said rotatable member, trigger mechanism for preventing the operation of said first mentioned means, releasable means for holding said trigger mechanism in operative position, and means operable by the rotation of said rotatable member for resetting said triger mechanism to stop the rotation of said rotatable member after it has completed a single revolution.

12. A device for marking moving strip material comprising a rotatable member having certain portions of its periphery more distant from the axis of rotation of said member than the other portions thereof, said member being normally positioned out of contact with said moving strip material, means for initiating the rotation of said rotatable member whereby the more distant portions of its periphery may be brought into contact with the moving strip material and the member rotated thereby, trigger mechanism for preventing the operation of said first mentioned means, releasable means for holding said trigger mechanism in operative position, and means operable by the rotation of said rotatable member for resetting said trigger mechanism to stop the rotation of said rotatable member after it has completed a single revolution.

13. A device for marking moving strip material comprising a rotatable member, having certain portions of its periphery closer to the axis of rotation of said member than the other portions thereof whereby to avoid contact with said moving strip material, means to initiate the rotation of said rotatable member whereby the unrelieved portion of its periphery may be brought into contact with the moving strip material and the member rotated thereby, trigger mechanism for preventing the operation of said first mentioned means, releasable means for holding said trigger in operative position, cam mechanism rotatable with said rotatable member, and means operable by said cam mechanism for resetting said trigger mechanism to stop the rotation of said rotatable member after it has completed a single revolution.

ALAN C. CHAMBERLIN.
HENRY W. NIEMAN.